US011597783B2

(12) United States Patent
Guzman-Carrazco et al.

(10) Patent No.: US 11,597,783 B2
(45) Date of Patent: Mar. 7, 2023

(54) PROCESS FOR PREPARATION OF MULTIMODAL POLYOLEFIN

(71) Applicant: SABIC GLOBAL TECHNOLOGIES B.V., Bergen Op Zoom (NL)

(72) Inventors: Job Daniel Guzman-Carrazco, Geleen (NL); Peter Groefsema, Geleen (NL); Maryam Tammadoni, Geleen (NL); Victor Mattheij, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 52 days.

(21) Appl. No.: 17/058,184

(22) PCT Filed: May 14, 2019

(86) PCT No.: PCT/EP2019/062303
§ 371 (c)(1),
(2) Date: Nov. 24, 2020

(87) PCT Pub. No.: WO2019/228791
PCT Pub. Date: Dec. 5, 2019

(65) Prior Publication Data
US 2021/0214473 A1 Jul. 15, 2021

(30) Foreign Application Priority Data

May 31, 2018 (EP) .................................... 18175316

(51) Int. Cl.
*C08F 10/02* (2006.01)
*C08F 2/00* (2006.01)
(Continued)

(52) U.S. Cl.
CPC .............. *C08F 10/02* (2013.01); *C08F 2/001* (2013.01); *C08F 2/01* (2013.01); *C08F 2/18* (2013.01); *C08F 10/06* (2013.01); *C08F 10/14* (2013.01)

(58) Field of Classification Search
USPC ............................................ 526/65; 422/134
See application file for complete search history.

(56) References Cited

U.S. PATENT DOCUMENTS 3,450,183 A * 6/1969 Hinton ................... C08F 10/00
422/135
6,225,421 B1 5/2001 Promel et al.
(Continued)

FOREIGN PATENT DOCUMENTS

CN          103387628 A      5/2012
WO       2015197558 A1    12/2015
(Continued)

OTHER PUBLICATIONS

Hexanes Material Safety Data Sheet MSDS # 326.00 (2 pages), 2008, Scholar Chemistry (Year: 2008).*
(Continued)

*Primary Examiner* — Fred M Teskin
(74) *Attorney, Agent, or Firm* — Cantor Colburn LLP

(57) ABSTRACT

The invention relates to a process for the preparation of a multimodal polyolefin polymer in a first polymerization reactor and a second polymerization reactor connected in series, wherein a first polyolefin polymer is prepared in the first polymerization reactor in suspension in the presence of hydrogen and a second polyolefin polymer is prepared in the second polymerization reactor in the presence of a lower concentration of hydrogen than in the first polymerization reactor, the process comprising: a) withdrawing a suspension of solid polyolefin particles in a suspension medium from the first polymerization reactor, wherein the suspension medium comprises hydrogen and a hydrocarbon mixture having an initial boiling point of at least 50° C. and a final boiling point of at most 120° C.; b) feeding the suspension to a flash drum having a pressure controlled by a vacuum pump, wherein the pressure of the flash drum is less than 0.1 MPa; c) vaporizing a part of the suspension medium in the flash drum to obtain a hydrogen-depleted suspension and d) withdrawing the hydrogen-depleted suspension from the flash drum and feeding it to the second polymerization reactor.

13 Claims, 1 Drawing Sheet

(51) Int. Cl.
*C08F 2/01* (2006.01)
*C08F 2/18* (2006.01)
*C08F 10/06* (2006.01)
*C08F 10/14* (2006.01)
*B01D 1/30* (2006.01)

(56) References Cited

U.S. PATENT DOCUMENTS

| | | |
|---|---|---|
| 6,716,936 B1 | 4/2004 | McGrath et al. |
| 6,924,340 B2 | 8/2005 | McGrath |
| 8,557,932 B2 | 10/2013 | Meier et al. |
| 9,175,120 B2 | 11/2015 | Marissal et al. |
| 2003/0191251 A1 | 10/2003 | McGrath |
| 2016/0369091 A1 | 12/2016 | Hjertberg et al. |
| 2018/0273708 A1* | 9/2018 | Kikuchi ................. A61L 27/16 |
| 2021/0388122 A1 | 12/2021 | Tamaddoni et al. |

FOREIGN PATENT DOCUMENTS

| | | | |
|---|---|---|---|
| WO | 2016188703 A1 | 12/2016 | |
| WO | WO 2018/046712 A1 * | 3/2018 | ................ C08F 2/01 |

OTHER PUBLICATIONS

International Search Report for International Application No. PCT/EP2019/062303, International Filing Date May 14, 2019, dated Jul. 23, 2019, 5 pages.

Written Opinion for International Application No. PCT/EP2019/062303, International Filing Date May 14, 2019, dated Jul. 23, 2019, 6 pages.

* cited by examiner

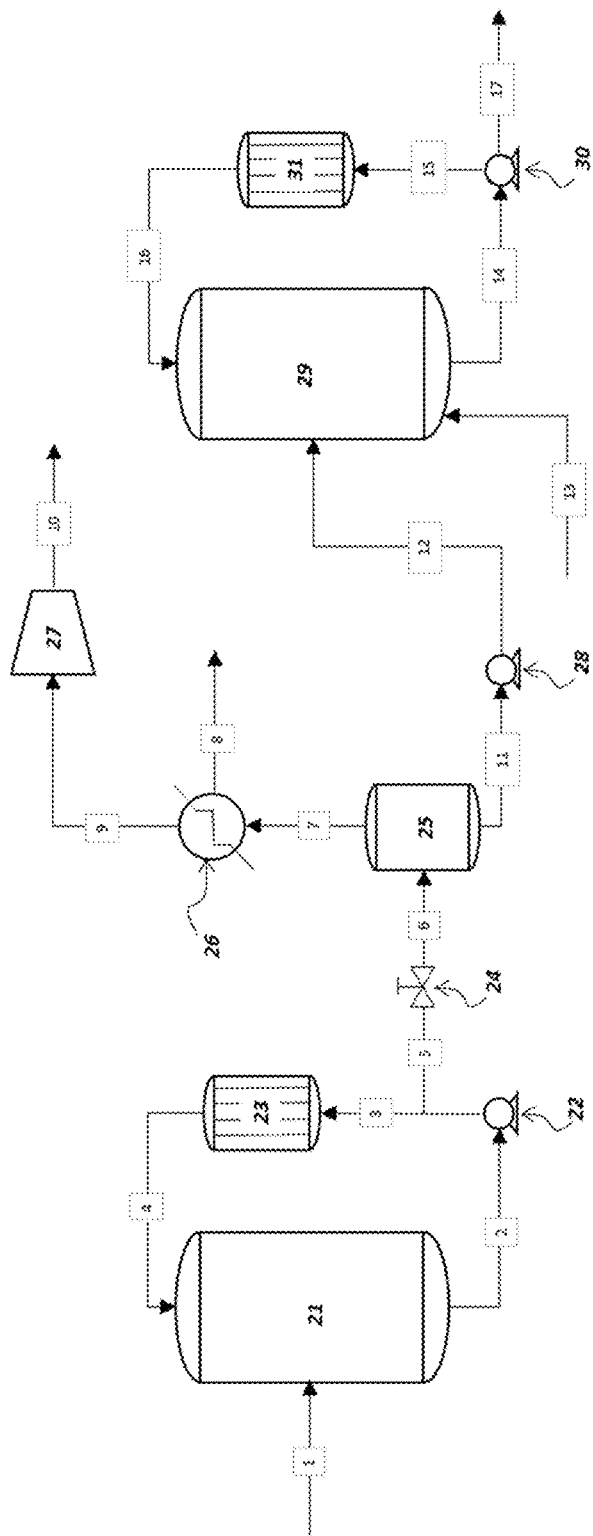

PROCESS FOR PREPARATION OF MULTIMODAL POLYOLEFIN

CROSS REFERENCE TO RELATED APPLICATIONS

This application is a National Stage application of PCT/EP2019/062303, filed May 14, 2019, which claims the benefit of European Application No. 18175316.1, filed May 31, 2018, both of which are incorporated by reference in their entirety herein.

BACKGROUND

The present invention relates to a process for the preparation of a multimodal polyolefin. The present invention further relates to a system for performing such process.

Suspension polymerization processes comprising two or more suspension polymerization reactors connected in series in which olefin monomers are polymerized in a liquid medium have been known for many years. One of the reasons why cascades of two or more polymerization reactors are frequently used is that it is possible to set different reaction conditions in the polymerization reactors and thereby, for example, broaden the molecular weight distribution. Polyolefin polymers with a broad molecular weight distribution are commonly used for a multitude of applications because they show advantages in product properties and processability. Such polymers are also often designated as bimodal or more generally as multimodal polyolefin polymers because they are polymerized in a cascade of two or more polymerization reactors under different reaction conditions. The term "multimodal", as used herein and also frequently used in the art, shall include "bimodal".

Multimodal polyolefin polymer can theoretically be obtained in different ways. It is possible to prepare physical blends of previously polymerized different polyolefin components. It is possible to use mixtures of different catalysts or so-called hybrid catalysts, which means catalysts with at least two different types of polymerization active sites on one catalyst particle in the same polymerization reactor. The commercially used way for preparing multimodal polyolefin is predominantly the polymerization in a cascade of polymerization reactors, where a polymerization catalyst is fed together with monomers to a first reactor, the produced polymer, which still contains active polymerization catalyst, is transferred to a second polymerization reactor, which has different reactor conditions, and the polymerization is continued using the polymerization catalyst still contained in the polymer particle. Normally the different reaction conditions in the different polymerization reactors are set by using different concentrations of hydrogen, which is commonly used as molecular weight regulator.

It is advantageous to start such a cascaded polymerization process with a step of preparing a lower molecular weight polyolefin polymer in the presence of a higher concentration of hydrogen, removing at least a part of the hydrogen when transferring the suspension to the next polymerization reactor and continuing there the polymerization in the presence of a lower concentration of hydrogen. This is described in several documents.

U.S. Pat. No. 6,225,421 describes a process for manufacturing an ethylene polymer composition where first an ethylene homopolymer having a melt flow rate MFR2 of 5 to 1000 g/10 min is prepared and then in a subsequent reactor an ethylene/1-hexene copolymer having a melt flow rate MFR5 of 0.01 to 2 g/10 min is produced. For removal of hydrogen from the reaction mixture of the first polymerization reactor, the reaction mixture withdrawn from the first polymerization reactor is subjected to an expansion step so as to vent at least some of the hydrogen. The pressure-reduction pressure is at least 0.1 MPa.

U.S. Pat. No. 6,924,340 refers to a process for the preparation of a polyolefin polymer, in which a polyolefin polymer is formed in the presence of hydrogen in a prior slurry reactor and the polymer product from the prior reactor is substantially freed of hydrogen prior to entry into a subsequent polymerization reactor operating at low hydrogen pressure to produce a high molecular weight olefin. The removal of hydrogen takes place by a series of at least two flash drums.

U.S. Pat. No. 8,557,932 describes a process for the preparation of a multimodal polyolefin polymer wherein the suspension from the first polymerization reactor is fed to a flash drum and partly vaporized and a hydrogen-depleted suspension is withdrawn from the flash drum and fed to the second polymerization reactor. Gas is withdrawn from the gas-phase of the flash drum and fed to a heat exchanger. A part of this gas is condensed and returned to the flash drum. The pressure in the flash drum is 0.1 to 1 MPa and the temperature is 50 to 90° C.

In known processes, it is a challenge to produce a multimodal polyolefin wherein the difference in the molecular weights of the polymers produced in the first and the second polymerization reactors is large.

SUMMARY

It is an objective of the present invention to provide a process in which the above-mentioned and/or other problems are solved.

Accordingly, the invention provides a process for the preparation of a multimodal polyolefin polymer in a first polymerization reactor and a second polymerization reactor connected in series, wherein a first polyolefin polymer is prepared in the first polymerization reactor in suspension in the presence of hydrogen and a second polyolefin polymer is prepared in the second polymerization reactor in the presence of a lower concentration of hydrogen than in the first polymerization reactor, the process comprising:

a) withdrawing a suspension of solid polyolefin particles in a suspension medium from the first polymerization reactor, wherein the suspension medium comprises hydrogen and a hydrocarbon mixture having an initial boiling point of at least 50° C. and a final boiling point of at most 120° C.;

b) feeding the suspension to a flash drum having a pressure controlled by a vacuum pump, wherein the pressure of the flash drum is less than 0.1 MPa;

c) vaporizing a part of the suspension medium in the flash drum to obtain a hydrogen-depleted suspension and d) withdrawing the hydrogen-depleted suspension from the flash drum and feeding it to the second polymerization reactor.

BRIEF DESCRIPTION OF THE DRAWING

The FIGURE shows an example of a schematic of the process according to the invention.

DETAILED DESCRIPTION

The present invention provides a process for the preparation of multimodal polyolefin polymers. In the context of the present invention the term "multimodal" shall indicate that the polyolefin comprises at least two fractions of polymers which are obtained under different polymerization conditions. That means the term "multimodal" as used herein shall include also "bimodal". The different polymerization conditions can for example be achieved by using different hydrogen concentrations in different polymerization reactors.

According to the process of the invention, the low pressure of the flash drum allows a better removal of hydrogen. A better removal of hydrogen leads to a larger difference in the molecular weights of the polymers produced in the first and the second polymerization reactors. The use of relatively heavy hydrocarbons which act as a solvent for relatively low molecular with species, and as a diluent for relatively high molecular weight polymer allows the separation of waxes from the polymer product, because waxes are soluble in relatively heavy hydrocarbons. Accordingly, the process according to the invention leads to a multimodal polyolefin polymer having a large difference in the molecular weights with a low amount of waxes. The process is also cost efficient since it uses a single flash drum instead of a series of flash drums.

Polyolefin

The polyolefin polymers which can be obtained by the process of the present invention can be homopolymers or copolymers of α-olefins, i.e. hydrocarbons having terminal double bonds, without being restricted thereto. Preferred monomers are nonpolar olefinic compounds, including aryl-substituted α-olefins. Particularly preferred α-olefins are linear or branched C2-C12-α-olefins, in particular linear C2-C10-α-olefins such as ethylene, propylene, 1-butene, 1-pentene, 1-hexene, 1-heptene, 1-octene, 1-decene or branched C2-C10-α-olefins such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is further possible to polymerize mixtures of two or more olefins.

The process can be used in particular for the homopolymerization or copolymerization of ethylene or propylene. Thus, the polyolefin polymer is preferably selected from ethylene homopolymer, an ethylene copolymer of ethylene and C3-C12 α-olefin, propylene homopolymer and a propylene copolymer of propylene and ethylene or C4-C12 α-olefin. As comonomers in ethylene polymerization, preference is given to using up to 40 wt. % of C3-C8-α-olefins, in particular 1-butene, 1-pentene, 1-hexene and/or 1-octene. Preferred comonomers in propylene polymerization are up to 40 wt. % of ethylene and/or butane.

Catalyst

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)2Cl2$, $Ti(OC_2H_5)2Cl2$, $Ti(O-n-C_4H_9)2Cl2$, $Ti(OC_2H_5)2Br2$, $Ti(OCH_3)3Cl$, $Ti(OC_2H_5)3Cl$, $Ti(O-n-C_4H_9)3Cl$, $Ti(OC_2H_5)3Br$, $Ti(OCH_3)4$, $Ti(OC_2H_5)4$ or $Ti(O-n-C_4H_9)4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides, Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides. SiCl4 or CCl4 and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di(C1-C10-alkyl) magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

Reactor

The process of the present invention is carried out in a cascade of at least two polymerization reactors which are connected in series. These reactors are not restricted to any specific design. Preferably, these reactors are however loop reactors or stirred tank reactors.

It is possible that the process of the present invention is only carried out in a cascade of two reactors, the first and the second polymerization reactor. It is however also possible that there are further reactors connected to these reactors upstream or downstream or upstream and downstream. Preferably also the further reactors are connected in series that an extended cascade results. Preferably the further reactors are added downstream of the two reactors. There is no limit to the number of further reactors, however preferably there are not more than two, more preferably only one further reactor added. Thus, in particularly preferred embodiments, the process of the present invention is carried out in a cascade of three polymerization reactors which are connected in series, which are the first reactor, the second reactor and the further reactor. The further polymerization reactor may be equipped with a hydrogen degassing system.

If there are further polymerization reactors added to the cascade of the first and the second polymerization reactor these further polymerization reactors can not only be suspension polymerization reactors but can utilize also other low-pressure polymerization methods like gas-phase polymerization. Preferably the further polymerization reactors are suspension polymerization reactors, in particular of the same type as the suspension reactors used in the cascade of the two reactors, or gas-phase reactors like horizontally or vertically stirred gas-phase reactors, fluidized bed gas-phase reactors or multizone circular reactors, in which two polymerization zones are linked to one another and the polymer is passed alternately a plurality of time through these two zones.

Suspension Medium

The polymerization in the at least two polymerization reactors of the present invention is carried out in suspension in a suspension medium. Hereby a suspension polymerization denotes a polymerization in which the polymerization is carried out in a medium, which is in liquid or in supercritical state under the conditions in the polymerization reactor, and in which the produced polyolefin is insoluble and forms solid particles. The solids content of the suspension is generally in the range of from 10 to 80 wt. %, preferably in the range of from 20 to 40 wt. %.

The suspension medium which forms the liquid or supercritical phase of the suspension comprises as main component the hydrocarbon mixture having an initial boiling point of at least 50° C. and a final boiling point of at most 120° C., i.e. a boiling range of 50 to 120° C., which acts as a diluent or a solvent. The initial boiling point of the hydrocarbon mixture may e.g. be at least 60° C., at least 70° C. or at least 80° C. The final boiling point of the hydrocarbon mixture may e.g. be at most 110° C. or at most 100° C. In particular, the boiling range may be 83 to 98° C. The suspension medium may comprise further components like solved monomers or for example solved hydrogen.

Preferably, the hydrocarbons in the hydrocarbon mixture having a boiling range of 50 to 120° C. are selected from hydrocarbons having 6 to 12 carbon atoms. Saturated hydrocarbons having 6 to 12 carbon atoms, in particular hexane, are preferred. The boiling range of the hydrocarbon may be measured by a standard method such as ASTM D1078. For example, the boiling range could be 83 to 98° C.

Hydrogen

Hydrogen is used in the process of the present invention to control the molecular weight of the polyolefin produced in the respective polymerization reactors, wherein the hydrogen concentration in the first polymerization reactor is higher than in the second polymerization reactor. Accordingly, generally the molecular weight of the polyolefin prepared in the second polymerization reactor is higher than in the first polymerization reactor.

First Polymerization Reactor

Preferably, the polymerization in the first polymerization reactor is carried out at a pressure of 0.1 to 20 MPa, preferably 0.1 to 5 MPa and particularly preferably 0.3 to 1.5 MPa.

Preferably, the polymerization in the first polymerization reactor is carried out at a temperature of 40 to 130° C., more preferably 50 to 110° C., and particularly preferably from 60 to 90° C. The temperature in the first polymerization reactor is below the melting point of the polymer in the first reactor.

Transfer from First Reactor to Flash Drum

The suspension from the first polymerization reactor is withdrawn and fed to a flash drum. Because of the pressure difference between the first polymerization reactor and the flash drum it is normally not necessary to use a pump for transferring the suspension.

The suspension can be withdrawn directly from the polymerization reactor. In case of a loop reactor it is also possible to withdraw the suspension from a settling leg.

Furthermore, if the first polymerization reactor is equipped with a cooling circle it is preferred to withdraw the suspension from the cooling circle, preferably after the circulation pump facilitating the transfer to the flash drum. In such a case the withdrawal point may be located after the heat exchanger. Then a suspension of a lower temperature than that in the first polymerization reactor is fed to the flash drum, limiting the amounts of evaporating components of the suspension medium.

More preferably the withdrawal point is located before the heat exchanger. Then the suspension is fed to the flash drum with essentially the same temperature as that of the suspension in the first polymerization reactor and the amount of vaporized material including driven out hydrogen is increased.

Flash Drum

A flash drum is generally a vessel which is operated at a lower pressure than that of the first polymerization reactor. Consequently the suspension medium starts to boil in the flash drum and a part of it is vaporized. In addition to evaporating the diluent also gases solved in the suspension are driven to the gas-phase. Accordingly, the concentration of hydrogen in the suspension in the flash drum is significantly lower than the concentration of hydrogen in the suspension in the first polymerization reactor.

The flash drum is generally of a volume that it can be operated partly filled with suspension and the remaining part is occupied by the gas mixture escaping from the suspension. The flash drum can be operated with or without a stirrer. It is further possible to have the flash drum equipped with a jacket for cooling or heating the flash drum in order to influence the temperature within the flash drum. It is further possible to use a series of more than one vessel as combined flash drum for the purpose of the present invention.

The pressure in the flash drum is controlled by a vacuum pump connected to the flash drum. The vacuum pump is configured to monitor and adjust the pressure in the flash drum. The vacuum pump may be a root blower. The pressure in the flash drum is lower than 0.1 MPa, for example 0.05 to 0.09 MPa. Such low pressure made possible by a vacuum pump allows $H_2$ concentration of below 1 ppm to be attained in the second reactor inlet.

The temperature in the flash drum is normally not controlled, and it is the result of an adiabatic or semi-adiabatic flash at the specified pressure of the vessel. For the typical pressures and diluents under consideration, the temperature of the flash vessel ranges from 40 to 80° C., more typically 60 to 80° C. In general, higher temperatures improve degassing. Higher temperatures can be attained by providing heat, e.g., via the vessel jacket, in a non-adiabatic flash. Temperatures lower than 40° C. are undesired and they may lead to wax deposition and fouling in the transfer line to the second reactor.

In some embodiments, a stripping agent (e.g. nitrogen) is introduced into the flash vessel. This further improves $H_2$ removal. However, the stripping agent must later be recovered in a separate process. Thus, in some embodiments, no stripping agent is introduced into the flash vessel.

Transfer from Flash Drum to Second Reactor

The polymer suspension in the flash drum, which is depleted in hydrogen with respect to the suspension fed to the flash drum, is withdrawn from the flash drum and fed to the second polymerization reactor. This is preferably carried out by means of a transfer pump.

Second Polymerization Reactor

Preferably, the polymerization in the second polymerization reactor is carried out at a pressure of 0.1 to 20 MPa, preferably 0.1 to 1 MPa and particularly preferably 0.1 to 0.5 MPa.

Preferably, the polymerization in the second polymerization reactor is carried out at a temperature of 40° C. to 130° C., more preferably 50 to 110° C., and particularly preferably from 60 to 90° C. The temperature in the second polymerization reactor is below the melting point of the polymer in the second reactor.

Heat Exchanger

A heat exchanger may be present between the flash drum and the vacuum pump. In this case, the gas in the flash drum is withdrawn from the flash drum and fed to the heat exchanger, where a part of the gas is condensed. The remaining part, which is not condensed, is preferably fed to the work-up section of the polymerization plant for recovering the components of the suspension medium and in particular directly to the monomer recovery unit.

Any kind of heat exchanger can be used. The heat exchanger may be a shell-and-tube heat exchanger. The temperature of the cooling medium, which, for example, can be cooling water or the cooling medium of a chiller, is preferably selected to be in the range of from −20 to 40° C.

In some embodiments, the heat exchanger is a vertical reflux condenser. In this case, the condensed liquid obtained in the heat exchanger flows down by gravity back to the flash vessel. In other embodiments, the heat exchanger is a condenser where the liquid is discharged to a separate tank using a barometric leg or a drain pump.

The liquid obtained in the heat exchanger may be fed to a point in the process where suspension is present, such as the flash vessel, the first polymerization reactor or the second polymerization reactor. Alternatively, the liquid obtained in the heat exchanger may be fed to a point in the process downstream of the second polymerization reactor where no slurry suspension is present Returning the liquid obtained in the heat exchanger to a point in the process where suspension is present reduces the amount of material needed to be treated in the monomer recovery section. Returning the liquid obtained in the heat exchanger further a point in the process downstream of the second polymerization reactor where no suspension is present reduces the solvent load in liquid/solid separation units such as the centrifuge and the dryer.

The present invention further provides a system for preparing a multimodal polyolefin polymer, comprising i) a first polymerization reactor designed for polymerizing olefins in suspension;

ii) a flash drum downstream of the first polymerization reactor;

iii) a vacuum pump configured to control the pressure of the flash drum; and iv) a second polymerization reactor designed for polymerizing olefins in suspension down-stream of the flash drum.

The system may further comprise:

v) a heat exchanger designed for condensing gas, connected to the flash drum by a conduit for transferring gas from the flash drum to the heat exchanger; and vi) a conduit, connected to the heat exchanger for returning the liquid obtained in the heat exchanger to a point in the system where suspension is present, such as the flash drum, the first polymerization reactor and/or the second polymerization reactor, or to a point in the system downstream of the second polymerization reactor where no suspension is present.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated with reference to the FIGURE which schematically illustrates an embodiment of the system of the invention.

The FIGURE shows an example of a schematic of the process according to the invention. The first polymerization reactor (21) receives a feed stream 1 containing diluent, monomers, catalyst, co-catalyst, and hydrogen. Feed injection can be done with one stream (as shown) or via multiple inlet streams. The reactor outlet, stream 2, is partially recirculated back to the reactor via a pump (22) and a heat exchanger (23) with stream 3 entering the heat exchanger (23) and stream 4 exiting the heat exchanger (23). The net outlet, stream 5, is depressurized via a valve (24) to form a liquid-vapour stream (6). Vapours from stream 6 are separated in the flash vessel (25), to form stream 7. Steam 7 is partially condensed in a heat exchanger (26). Liquid condensate, stream 8, can be recycled back to the flash (25) or back to the first reactor (21), or it can be sent forward to the second reactor (29), or even further downstream to a point in the process where only diluent, and no polymer, is present. Non-condensable gases, stream 9, are sent to a vacuum pump (27). Compressed gases, stream 10, can be sent to a monomer recovery unit, or to a different plant. The bottom outlet of the flash vessel (stream 11) is sent via a pump (28) as stream 12 to the second reactor (29), which can receive additional feed components via stream 13. The bottom stream 14 of the second reactor (29) is sent to a pump (30). The pump outlet is partially sent to a heat exchanger (31) as stream 15. The stream 16 exited the heat exchanger (31) is recircled back to the second reactor (29). The net outlet of the second reactor (stream 17) can be flashed following a similar process as that undergone by stream 5.

The invention claimed is:

1. A process for the preparation of a multimodal polyolefin polymer in a first polymerization reactor and a second polymerization reactor connected in series, wherein a first polyolefin polymer is prepared in the first polymerization reactor in suspension in the presence of hydrogen and a second polyolefin polymer is prepared in the second polymerization reactor in the presence of a lower concentration of hydrogen than in the first polymerization reactor, the process comprising:
    a) withdrawing a suspension of solid polyolefin particles in a suspension medium from the first polymerization reactor, wherein the suspension medium comprises hydrogen and a hydrocarbon mixture having an initial boiling point of at least 50° C. and a final boiling point of at most 120° C.;
    b) feeding the suspension to a flash drum having a pressure controlled by a vacuum pump, wherein the pressure of the flash drum is less than 0.1 MPa;
    c) vaporizing a part of the suspension medium in the flash drum to obtain a hydrogen-depleted suspension; and
    d) withdrawing the hydrogen-depleted suspension from the flash drum and feeding it to the second polymerization reactor,
    wherein a further reactor is connected to upstream of the first polymerization reactor and/or downstream of the second polymerization reactor; and
    wherein the further reactor is equipped with a hydrogen degassing system.

2. The process according to claim 1, wherein the polyolefin polymer is selected from ethylene homopolymer, an ethylene copolymer of ethylene and C3-C12 α-olefin, propylene homopolymer and a propylene copolymer of propylene and ethylene or C4-C12 α-olefin.

3. The process according to claim 1, wherein the hydrocarbon mixture comprises hydrocarbons selected from the group of C6 to C12 hydrocarbons.

4. The process according to claim 1, wherein the first polymerization reactor is carried out at pressures of 0.1 to 5 MPa and temperatures of 40° C. to 130° C., and/or the second polymerization reactor is carried out at pressures of 0.1 to 5 MPa and temperatures of 40° C. to 130° C.

5. Process according to claim 1, wherein gas from a gas-phase of the flash drum is withdrawn from the flash drum and fed to a heat exchanger present between the flash drum and the vacuum pump, to condense the gas forming a liquid.

6. The process according to claim 5, wherein the liquid obtained in the heat exchanger is fed to a point in the process where suspension is present.

7. The process of claim 5, wherein the liquid obtained in the heat exchanger is fed to a point in the process downstream of the second polymerization reactor where no suspension is present.

8. The process according to claim 5, wherein the heat exchanger is a vertical reflux condenser and the condensed liquid flows down back to the flash vessel by gravity.

9. The process according to claim 5, wherein the liquid obtained in the heat exchanger is fed to the flash drum, the first polymerization reactor and/or the second polymerization reactor.

10. A system for preparing a multimodal polyolefin polymer, comprising
    i) a first polymerization reactor designed for polymerizing olefins in suspension;
    ii) a flash drum downstream of the first polymerization reactor;
    iii) a vacuum pump configured to control the pressure of the flash drum to a pressure of 0.05 to 0.09 MPa during operation;
    iv) a second polymerization reactor designed for polymerizing olefins in suspension down-stream of the flash drum; and
    a further reactor that is connected to upstream of the first polymerization reactor and/or downstream of the second polymerization reactor;
    wherein the further reactor is equipped with a hydrogen degassing system.

11. The system according to claim 10, further comprising
    v) a heat exchanger designed for condensing gas, connected to the flash drum by a conduit for transferring gas from the flash drum to the heat exchanger; and vi) a conduit, connected to the heat exchanger for returning the liquid obtained in the heat exchanger to a point in the system where suspension is present.

12. The system according to claim 10, further comprising v) a heat exchanger designed for condensing gas, connected to the flash drum by a conduit for transferring gas from the flash drum to the heat exchanger; and vi) a conduit, connected to the heat exchanger for returning the liquid obtained in the heat exchanger to a point in the system downstream of the second polymerization reactor where no suspension is present.

13. The system according to claim 11, wherein the conduit is connected to the heat exchanger for returning the liquid obtained in the heat exchanger to the flash drum, the first polymerization reactor and/or the second polymerization reactor.

\* \* \* \* \*